United States Patent

Reno, Jr.

[11] Patent Number: 4,468,715
[45] Date of Patent: Aug. 28, 1984

[54] ON/OFF AND SHUTDOWN CIRCUIT FOR CRT PROJECTION SYSTEM

[75] Inventor: James J. Reno, Jr., Schaumburg, Ill.

[73] Assignee: Zenith Electronics Corporation, Glenview, Ill.

[21] Appl. No.: 493,084

[22] Filed: May 9, 1983

[51] Int. Cl.³ .......................................... H01H 47/32
[52] U.S. Cl. ................................... 361/186; 361/190; 361/194
[58] Field of Search ............ 361/186, 190, 194, 168.1, 361/160

[56] References Cited

FOREIGN PATENT DOCUMENTS 682928 8/1979 U.S.S.R. .............................. 361/186

Primary Examiner—Reinhard J. Eisenzopf

[57] ABSTRACT

A shutdown circuit for a TV projection monitor includes a standby power supply energizing a main power supply through contacts controlled by a relay winding in the load circuit of a control transistor that is cut off by a pair of latch transistors that receive operating power through the relay winding. Closure of a momentary contact switch effectively disables the latch transistors and grounds one end of the relay winding which is thereby energized to enable the main power supply. Disabling the latch transistors permits the control transistor to become conductive and hold the relay winding energized. A subsequent closure of the momentary contact switch applies sufficient potential to the latch transistors to drive them conductive and disables the relay winding for deenergizing the main power supply.

7 Claims, 1 Drawing Figure

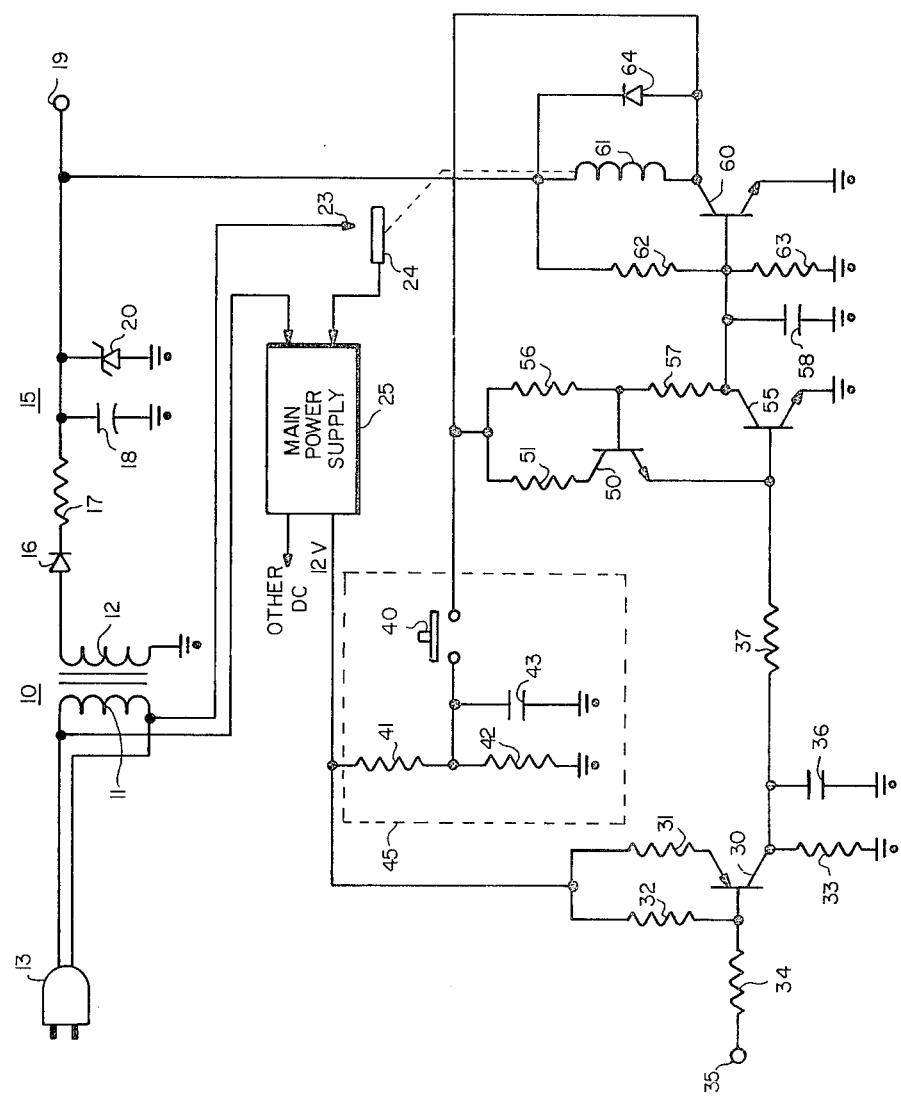

4,468,715

ON/OFF AND SHUTDOWN CIRCUIT FOR CRT PROJECTION SYSTEM

BACKGROUND OF THE INVENTION

This invention relates in general to projection type television systems having shutdown circuits for protection in the event of failures and particularly to on/off circuits useful with such shutdown circuits.

Interest in large screen television systems using optical projection for achieving large video displays is increasing. Most such systems incorporate three small single-color cathode ray tubes (CRT's) with corresponding projection lenses for simultaneously and convergently displaying the three independent color pictures upon either a large projection screen or upon a blank light-colored area, such as a wall. To achieve suitable brightness levels the individual color CRT's are driven at very high levels which creates a substantial amount of heat. A form of protection, known as a shutdown circuit is provided for disabling the CRT circuitry in the event of a malfunction in the system which could impose destructive operating conditions on the CRT's.

With the increasing use of video tape recorders, video games, and portable computers, which do not have associated display systems, a demand for video monitors has arisen. While the demand is greatest for monochrome monitors, there is a growing need for color monitors and for large display color projection monitors.

A monitor by definition, is a "stand alone" device and therefore needs its own power switch. With the growing use of microprocessor-based electronic equipment, on/off switches of the low voltage, momentary contact type have found increasing favor. Such switches provide line isolation, ease of operation and user compatability with present day equipment. They are also very simple and reliable.

OBJECTS OF THE INVENTION

Accordingly the principal object of this invention is to provide an improved projection television monitor.

A further object of this invention is to provide a simple on/off switch arrangement for a projection CRT system having a built-in shutdown circuit.

SUMMARY OF THE INVENTION

A main power supply is controlled by a relay winding in the load circuit of a control transistor. A standby power source is connected to the relay winding and powers a latch transistor therethrough for alternately enabling and disabling the control transistor responsive to successive operation of momentary contact switch means.

BRIEF DESCRIPTION OF THE DRAWING

Further objects and advantages of the invention will become apparent by reading the following description in conjunction with the drawing which is a partial schematic diagram of a shutdown circuit for a projection TV monitor incorporating a low voltage momentary contact on/off switch.

DESCRIPTION OF THE PREFERRED EMBODIMENT

Before referring to the single FIGURE of the drawings, it should be noted that although the circuit is intended for use with a projection TV monitor, it is useful in similar applications for any electronic device incorporating a shutdown circuit for automatically disabling the power supply in the event of a failure condition. In general the invention will find its most advantageous application with electronic equipment that is remotely operable and therefore includes a source of standby power in addition to a main power supply. The circuit includes a conventional AC line voltage transformer 10 having a primary winding 11 and a secondary winding 12. Primary winding 11 is directly connected to a wall plug 13, which is connectable to a conventional household outlet providing 120 volt 60 Hz AC power. One end of secondary winding 12 is connected to ground and the other to a DC voltage source 15 which includes a diode 16 connected through a resistor 17 to a capacitor 18 and a zener regulating diode 20, connected across capacitor 18 for providing a stable source of DC potential. The other terminals of capacitor 18 and zener diode 20 are connected to ground. The output of DC source 15 is 12 volts and is supplied to a terminal 19 for powering a remote control receiver (not shown) and for feeding a relay winding 61.

One side of plug 13 is connected to a main power supply 25 and the other to a relay contact 23. Another relay contact 24, which makes electrical connection with contact 23 upon energization of relay winding 61, completes the connection of main power supply 25 to the 60 Hz power source. Main power supply 25 supplies the DC potential required by the remainder of the electronic circuitry (not shown) and the DC voltage for a portion of the shutdown circuit. The main DC supply voltage and the DC shutdown supply voltage may of course be selected as required, the 12 volt DC shown being that used in an actual circuit embodiment.

The shutdown circuit includes a transistor 30 having an emitter resistor 31 and a base resistor 32, both returned to the 12 volt output of main power supply 25, and a collector resistor 33 connected to ground. A shutdown input terminal 35 is connected to the base of transistor 30 through a resistor 34. The collector of transistor 30 is bypassed to ground by a capacitor 36 and supplies an output signal through a resistor 37 to the commonly connected emitter of a transistor 50 and base of a transistor 55. Transistors 50 and 55 constitute a latch circuit and they are normally nonconductive. The collector of transistor 50 is connected through a resistor 51 and a momentary contact switch 40 to the junction of a voltage divider comprising a pair of resistors 41 and 42 connected between the 12 volt terminal of power supply 25 and ground. Resistor 42 is bypassed to ground by a capacitor 43. Collector resistor 51 is also connected through a pair of resistors 56 and 57 to the collector of transistor 55 with the junction of the resistors being connected to the base of transistors 50. The emitter of transistor 55 is connected to ground. The collector of transistor 55 is bypassed to ground by a capacitor 58 and is connected to the base of a transistor 60 which has its emitter electrode connected to ground. Relay winding 61 is the collector load of transistor 60 and is connected back to DC supply 15.

Bias for transistor 60 is derived from DC supply 15 through the series connected resistors 62 and 63, the junction of which is connected to its base. A diode 64, for suppression of transients during energization and deenergization of relay winding 61, is connected across the relay winding. The collector of transistor 60 is returned to the junction of resistors 51 and 56 and momentary contact switch 40. The dashed line joining relay winding 61 and contact 24 indicates an operative mechanical connection for moving the contact upon energization of the relay winding. When relay winding 61 is deenergized, contacts 23 and 24 are not in electrical engagement.

The dashed line box 45 encircling momentary contact switch 40, resistors 41 and 42 and capacitor 43 represents the momentary contact on/off circuit which has been added to the shutdown circuit of the prior art. In the following operational description the added components in box 45 will be temporarily ignored.

Under standby conditions, transformer 10 is energized and DC potential exists at terminal 19. The prior art circuit includes a remotely operated set of switch contacts (not shown) coupling power supply 15 to relay winding 61. Upon closure of those switch contacts, 12 volts is applied to transistor 60 which is driven conductive because of the bias developed across resistors 62 and 63. Latch transistors 50 and 55 are not driven conductive because the voltage at the collector of transistor 60 is near ground when transistor 60 is conductive. Relay winding 61 is energized and closes contacts 23, 24 to energize main power supply 25.

Transistor 30, which constitutes a trigger for the latch transistors 50 and 55, remains nonconductive despite the 12 volts applied through resistors 31 and 32 because an improper voltage is present at shutdown terminal 35, preventing forward bias being developed. Upon occurrence of a suitable DC level change at shutdown terminal 35, indicating that too much drive current is being drawn by the CRT's, transistor 30 is driven conductive and turns on latch transistors 50 and 55 which in turn force the base of transistor 60 toward ground to turn it off and cause relay 61 to release contacts 23 and 24 and shut down the main power supply.

With the addition of the momentary contact switch 40 and associated circuitry, the shutdown circuit of the prior art additionally becomes the on/off control for the device. Assume that in the standby mode latch transistors 50 and 55 are conductive and transistor 60 is nonconductive. The 12 volts from DC supply 15 is supplied to the latch transistors 50 and 55 through relay winding 61. Relay winding 61 is not energized however, since the current therein is insufficient. Thus, the main supply 25 is off and capacitor 43 is discharged placing one end of switch 40 at ground potential. Closure of momentary contact switch 40 connects the lower end of relay winding 61 and the collector of transistor 60 to this ground thus energizing relay winding 61 to close contacts 23 and 24 and completing a circuit to main power supply 25. Switch 40 removes the operating voltage from the latch transistors causing them to be driven nonconductive. The potential at the junction of resistors 62 and 63 forward biases the base of transistor 60, driving it conductive. When transistor 60 conducts, sufficient current flows in winding 61 to keep it energized when momentary contact switch 40 is released. When the main power supply comes on capacitor 43 is charged to approximately 5 volts DC due to the voltage divider network consisting of resistors 41 and 42. Transistor 30 remains nonconductive, whether the main power supply is on or off, just as it did in the prior art circuit.

A subsequent operation of momentary contact switch 40 applies the DC potential existing across capacitor 43 to the latch circuit resistors 51 and 56 to drive latch transistors 50 and 55 conductive and, in turn, drive the base of transistor 60 toward ground. Simultaneously the 5 volt DC potential is applied to the lower end of relay winding 61, which reduces the voltage across the relay winding to less than that required to maintain energizing current therein. Contacts 23 and 24 are thus released and disable main power supply 25.

The shutdown circuit operates as before in the event of a suitable DC signal applied to shutdown terminal 35.

Accordingly, a low voltage momentary contact switch has been added to a conventional projection TV shutdown circuit to enable use of the shutdown circuit as an on/off control. It is recognized that numerous modifications in the described embodiment of the invention will be apparent to those skilled in the art without departing from its true spirit and scope. The invention is to be limited only as defined in the claims.

I claim:

1. In combination:
a main power source;
a shutdown circuit, including a control transistor having a relay winding in its load circuit for controlling energization of said main power source;
a standby power source connected to said relay winding;
a latch transistor coupled to said control transistor and deriving its operating power through said relay winding; and
momentary contact switch means for enabling said latch transistor and disabling said control transistor and enabling said control transistor and disabling said latch transistor to effect on/off control of said main power source.

2. The combination as set forth in claim 1 wherein said momentary contact switch means are effective to alternately apply two different potentials to said latch transistor and said relay winding.

3. The combination as set forth in claim 2 wherein said momentary contact means includes a bypassed source of DC potential supplied from said main power supply.

4. The combination as set forth in claim 3 wherein said control transistor has an emitter connected to ground and a collector connected to said relay winding and wherein said standby power source supplies approximately 12 volts and said bypassed DC source supplies approximately 5 volts.

5. The combination as set forth in claim 4 wherein said latch transistor is coupled to the base of said control transistor, and further including;
a voltage divider coupled to said standby power source and having its junction connected to said base of said control transistor.

6. A shutdown circuit for use with a projection TV monitor including a standby power supply, a main power supply, a pair of relay contacts for energizing said main power supply and being actuatable by a relay winding in the load circuit of a control transistor, and a shutdown circuit for disabling the control transistor and including a pair of latch transistors energized through said relay winding for disabling said control transistor upon receipt of a shutdown signal, the improvement comprising;
momentary contact switch means for controlling energization of said main power supply by alternately enabling and disabling said latch transistors.

7. A shutdown circuit as claimed in claim 6 wherein said momentary contact switch means are effective to alternately apply two different potentials to said latch transistors and said relay winding.

* * * * *